No. 785,726. Patented March 28, 1905.

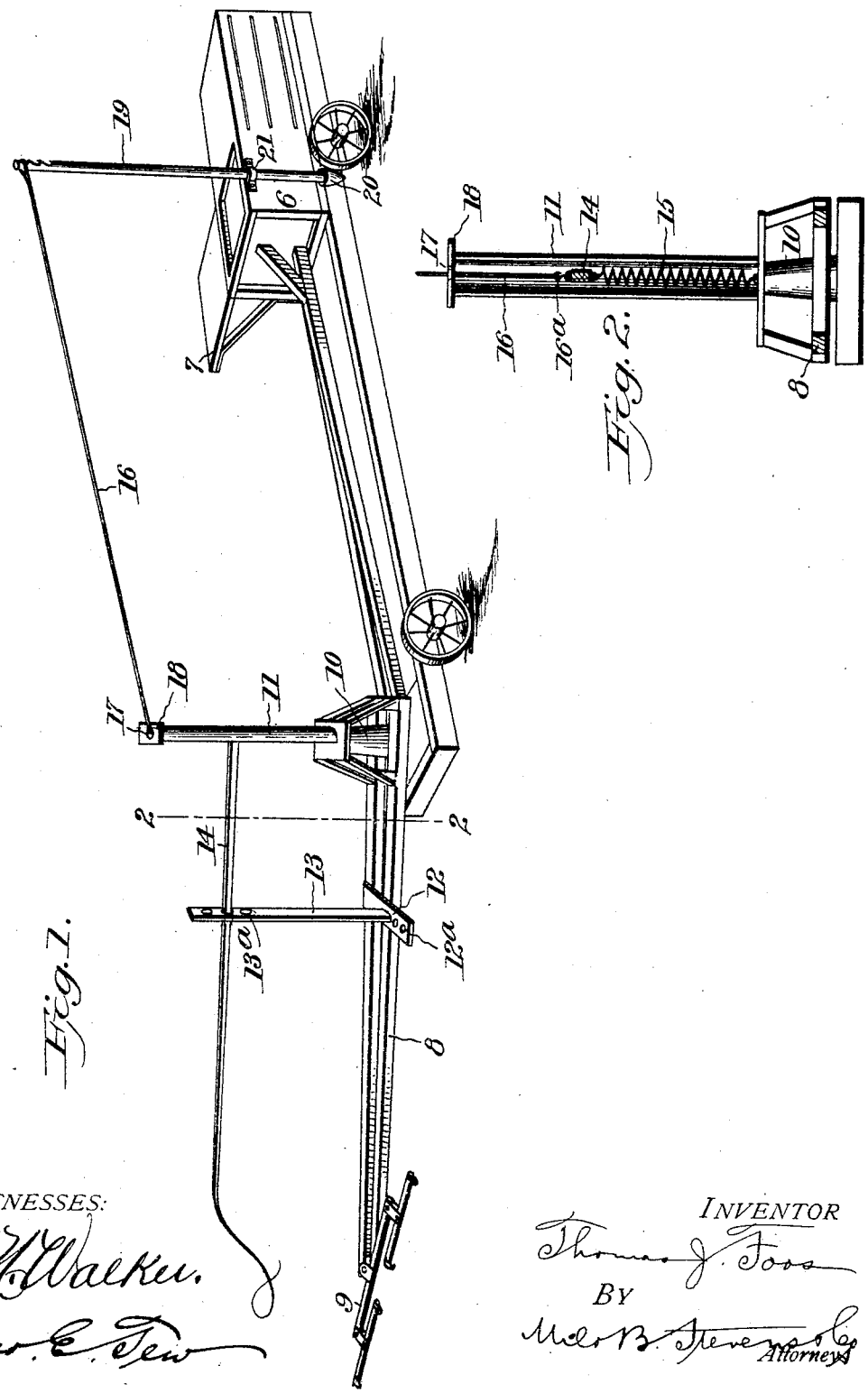

UNITED STATES PATENT OFFICE.

THOMAS J. FOOS, OF MARION, OHIO.

WHIPPING DEVICE.

SPECIFICATION forming part of Letters Patent No. 785,726, dated March 28, 1905.

Application filed May 28, 1904. Serial No. 210,280.

*To all whom it may concern:*

Be it known that I, THOMAS J. FOOS, a citizen of the United States, residing at Marion, in the county of Marion and State of Ohio, have invented new and useful Improvements in Whipping Devices, of which the following is a specification.

This invention is a device for applying the whip to horses on a horse-power in which the team travels around a circular track, such horse-powers being commonly used in connection with baling-presses and the like.

The object of the invention is to provide a device by which the whip may be applied to the horses at any point of the track by an operator stationed at the feeding-platform or other adjacent places.

In the accompanying drawings, Figure 1 is a perspective view of the apparatus. Fig. 2 is a section on the line 2 2 of Fig. 1.

Referring specifically to the drawings, a baling-press is indicated at 6 and its feeding-platform at 7, on which the feeder stands. The sweep is shown at 8, and at 9 a whiffletree by which the team is hitched thereto.

10 indicates the turning pillar or shaft of the master-wheel, to which shaft the sweep is fixed. Projecting upwardly from the top of the shaft is a semicircular post 11.

12 indicates a bracket carried by the sweep, and upon this bracket is mounted a standard 13, the foot of which is reduced and threaded to screw into one of a series of holes $12^a$ in the bracket. This permits an adjustment of the standard 13, whereby the whip may be brought to strike the team at any desired place or according to the length of hitch. The whip-stock 14 is carried at the top of the standard 13 and extends through one of the series of holes $13^a$ for proper or desired vertical adjustment. The butt of the whip-stock extends to and within the hollow of the half-round post 11, where it is connected by a spiral spring 15 with the top of the shaft. The spring tends to lift the whip by lowering its butt. On its upper side the butt of the whip is connected to a rope 16, which extends thence through a hole 17 in a plate 18 on top of the post and then to the top of a post 19 of sufficient height to clear the horse. The post 19 stands beside the feeding-platform and is conveniently held by a socket 20 and strap 21, fixed to the frame of the press. The hook $16^a$, by which the rope is connected to the butt of the whip, is a swiveling hook to avoid twisting the rope during the rotation of the post.

In use the whip is carried with the sweep and may be applied to the backs of the horses by a smart pull of the rope, which is in convenient reach of the operater on the platform. This can be done in any position of the horses. The elevation of the rope and the swiveling connection prevent fouling. The post 13 acts as a fulcrum for the whip, and when the rope is released the spring 15 returns the whip to its original position. The device is capable of application to horse-powers of all kinds in which the team travels around a circular track.

What I claim as new, and desire to secure by Letters Patent, is—

The combination with a sweep of a horse-power, of a hollow post projecting upwardly from, and turning with, its pivot, a whip carried by the sweep with its butt projecting within the post directly over said pivot, an operating-rope having a swiveling connection with the butt and extending thence upwardly over the top of the post, and a spring connected between the whip and the sweep, to return the former to its normal position.

In testimony whereof I have signed my name to this specification in the presence of two subscribing witnesses.

THOMAS J. FOOS.

Witnesses:
GEO. B. SCOFIELD,
W. E. SCOFIELD.